United States Patent
Ben-Yehuda et al.

(10) Patent No.: US 8,458,698 B2
(45) Date of Patent: Jun. 4, 2013

(54) IMPROVING PERFORMANCE IN A NESTED VIRTUALIZED ENVIRONMENT

(75) Inventors: Muli Ben-Yehuda, Haifa (IL); Abel Gordon, Haifa (IL); Aviad Zlotnick, Mitzpeh Netofah (IL); Nadav Y. Har'El, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 12/948,796

(22) Filed: Nov. 18, 2010

(65) Prior Publication Data

US 2012/0131571 A1     May 24, 2012

(51) Int. Cl.
*G06F 9/455*     (2006.01)

(52) U.S. Cl.
USPC ............................................................ 718/1

(58) Field of Classification Search
None
See application file for complete search history.

(56) References Cited

U.S. PATENT DOCUMENTS

| | | | |
|---|---|---|---|
| 2003/0037089 A1 | 2/2003 | Cota-Robles et al. | |
| 2005/0076186 A1 | 4/2005 | Traut | |
| 2007/0028238 A1* | 2/2007 | Bennett et al. | 718/1 |
| 2007/0050764 A1 | 3/2007 | Traut | |
| 2008/0288940 A1 | 11/2008 | Adams et al. | |
| 2010/0191888 A1* | 7/2010 | Serebrin et al. | 710/269 |
| 2010/0332910 A1* | 12/2010 | Ali et al. | 714/45 |
| 2011/0072428 A1* | 3/2011 | Day et al. | 718/1 |

OTHER PUBLICATIONS

"User/Admin Documentation on Tuning KVM", (Sep. 15, 2010), p. 1-3 [retireved from http://web.archive.org/web/20100915030230/http://www.linux-kvm.org/page/Tuning_KVM on Aug. 20, 2012].*

Keith Adams and Keith Adams, "A comparison of software and hardware techniques for x86 virtualization" , ASPLOS'06 Oct. 21-25, 2006, San Jose, California, USA.

Paul A. Karger, Multi-level security requirements for hypervisors, Proceedings of the 21st Annual Computer Security Applications Conference (ACSAC 2005). IEEE 2005.

Michael Myers and Stephen Youndt, "An introduction to hardware-assisted virtual machine (hvm) rootkits", Aug. 7, 2007.

Muli Ben-Yehuda et al., "The Turtles Project: Design and Implementation of Nested Virtualization", IBM research labs, Jan. 2010. URL: (http://domino.watson.ibm.com/library/CyberDig.nsf/ papers/ 40C22ABDFD2CECAC8525772000584FCA/$File/h-0282.pdf).

Wing-Chi Poon and Aloysius K. Mok, "Bounding the Running Time of Interrupt and Exception Forwarding in Recursive Virtualization for the x86 Architecture", Technical Report VMware-TR-2010-003 Oct. 20, 2010. URL: http://www.vmware.com/files/pdf/partners/academic/hh.pdf.

* cited by examiner

*Primary Examiner* — Jennifer To
*Assistant Examiner* — James J Lee
(74) *Attorney, Agent, or Firm* — F. Jason Far-hadian; Century IP Group (57) ABSTRACT

Methods and systems for improving performance in a virtualization environment. The method comprising: detecting, by a first software, a first set of features supported by a hardware device, wherein the first software runs on the hardware device; detecting a second set of features with which to run a second software, wherein the second software is launched by the first software with the second set of features; exposing one or more features in the second set of features to the second software, wherein the second software detects and enables the exposed features for a third software launched by the second software; and emulating a first feature without causing a trap such that control is transferred to the second software, in response to determining that the first feature is an exposed feature not included in the first set of features, wherein one or more sensitive events are associated with the first feature.

20 Claims, 6 Drawing Sheets

IMPROVING PERFORMANCE IN A NESTED VIRTUALIZED ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The disclosed subject matter relates generally to virtualization in a computing system and, more particularly, to improving performance in a nested virtualization environment.

BACKGROUND

In a computing system, host software, or a hypervisor, may provide a simulated computing environment, or a virtual machine (VM), for guest software running on the hypervisor. The VM allows the guest software to execute as if the guest software were running directly on the underlying hardware, or a physical machine.

A typical physical machine (e.g., a processor) operates in at least two modes: a non-root mode and a root mode. The physical machine generally operates in the non-root mode to execute the guest software's non-privileged instructions, but may switch to the root mode upon detecting a privileged instruction that is to be managed by the hypervisor. Switching between modes is commonly referred to as trapping.

VMs are typically implemented based on traditional software virtualization concepts to support virtualization features such as server consolidation, fault containment, security, and resource management. Most said virtualization features are implemented at the cost of significant performance overhead due to traps caused each time a virtualization feature is accessed by the guest software.

Systems and methods are needed to overcome the above-mentioned shortcomings.

SUMMARY

The present disclosure is directed to methods, systems, and computer program products that facilitate improving performance in a nested virtualization environment.

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for improving performance in a nested virtualization environment is provided. The method comprises detecting, by a first software, a first set of features supported by a hardware device, wherein the first software runs on the hardware device; detecting a second set of features with which to run a second software, wherein the second software is launched by the first software with the second set of features; exposing one or more features in the second set of features to the second software, wherein the second software detects and enables the exposed features for a third software launched by the second software; and emulating a first feature without causing a trap such that control is transferred to the second software, in response to determining that the first feature is an exposed feature not included in the first set of features, wherein one or more sensitive events are associated with the first feature.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1A:
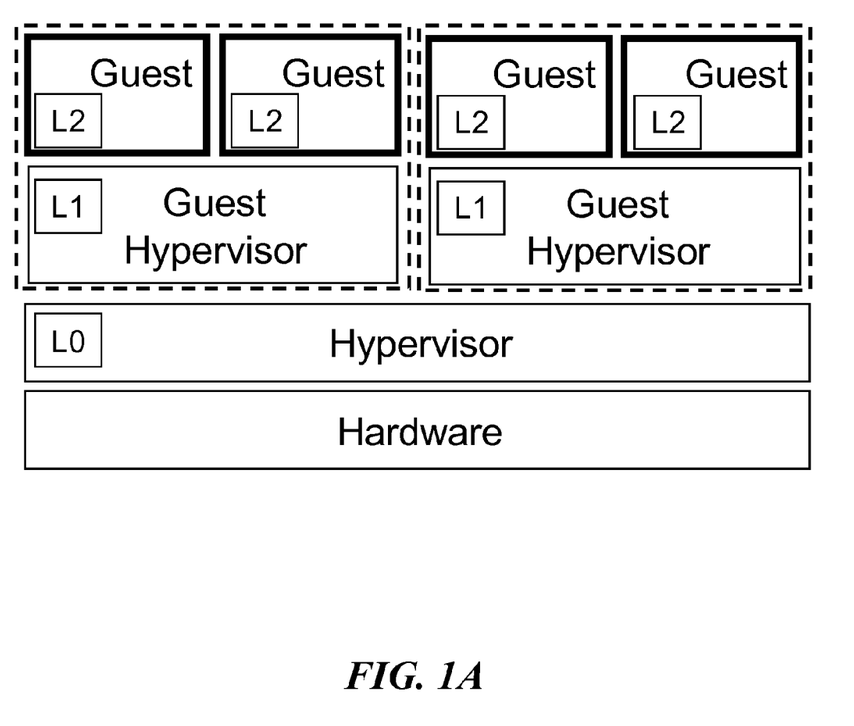
FIGS. 1A and 1B are diagrams of exemplary nested virtualization environments, in accordance with one embodiment.

Referring to FIG. 1A, in a nested virtualization environment, multiple hypervisors and guest software run on a physical machine in a nested manner. For example, a first hypervisor may run directly on the physical machine, a second hypervisor may run as first guest software on the first hypervisor, and second guest software may run on the second hypervisor. In such an environment, interactions between the different levels of software may contribute to the performance overhead introduced by software virtualization.

Hardware-assisted virtualization may reduce the performance overhead introduced by software virtualization. In hardware-assisted virtualization, one or more virtualization features are supported by the physical machine instead of by the software, thereby reducing the number of traps caused in a nested virtualization environment. It is desirable to implement systems in which hardware-assisted virtualization technologies adequately reduce the performance overhead introduced by software virtualization where many virtualization features are implemented using software.

Figure 1B:
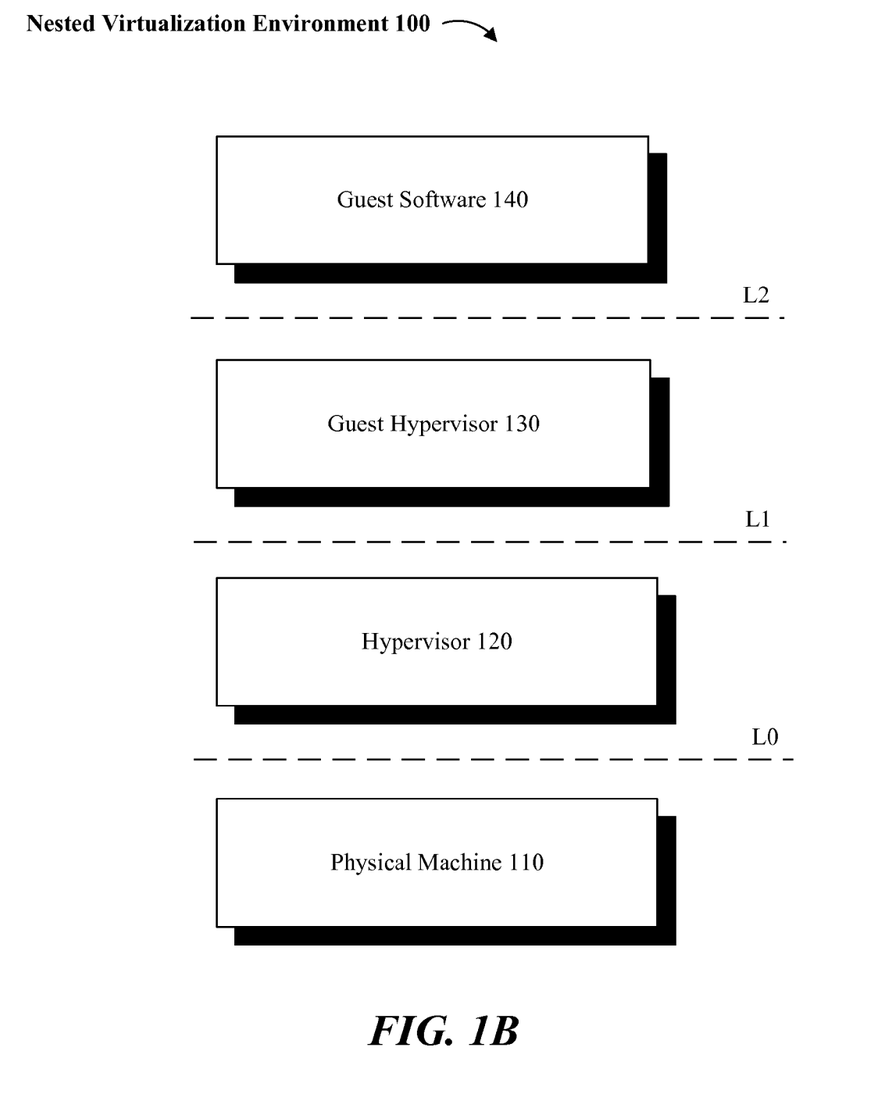

Referring to FIG. 1B, in accordance with one embodiment, an exemplary nested virtualization environment 100 comprises a physical machine 110 and three levels of virtualization. The root level (L0) comprises a hypervisor 120; level 1 (L1) comprises a guest hypervisor 130; and level 2 (L2) comprises a guest software 140. The L0 hypervisor 120 runs directly on the physical machine 110 and implements a VM for the L1 guest hypervisor 130. The L1 guest hypervisor 130 runs on the L0 hypervisor 120 and implements a VM for the L2 guest 140. The L1 guest hypervisor 130 and the L2 guest 140 may each be launched with a set of virtualization features. Each of the features may be supported through hardware (i.e., the physical machine 110) or software (i.e., the underlying host hypervisor).

Figure 2:
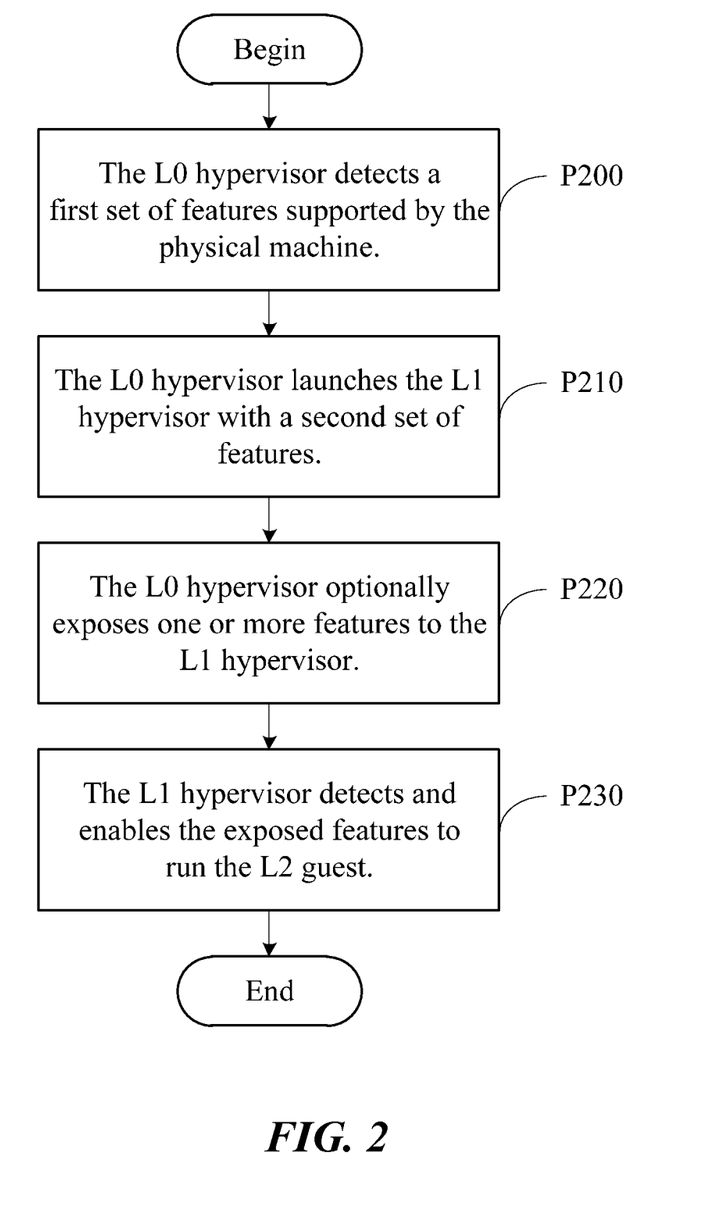
FIG. 2 is a flow chart of a method for enabling virtualization features for guest software, in accordance with one embodiment.

Referring to FIGS. 1B and 2, in accordance with one embodiment, the L0 hypervisor 120 may be configured to detect a first set of features supported by the physical machine 110 (P200). The L0 hypervisor 120 may launch the L1 guest hypervisor 130 with a second set of features (P210). In one embodiment, the second set of features may include features that are not included in the first set as long as the L0 hypervisor 120 is configured to emulate such features.

For each feature in the second set that is not included in the first set (i.e., not supported by the physical machine 110), the L0 hypervisor 120 optionally exposes the feature to the L1 hypervisor 130 (P220). Exposing a feature, as used in this context, refers to making the feature detectable by the next-level hypervisor. If the feature is exposed to the L1 hypervisor 130, the L1 hypervisor 130 detects and enables the feature to run the L2 guest 140 (i.e., makes the feature available when running the L2 guest 140) (P230). In this manner, the feature is used by L1 hypervisor, wherein L1 hypervisor instructs the physical machine to handle a sensitive event corresponding to said feature, without creating a trap.

Figure 3:
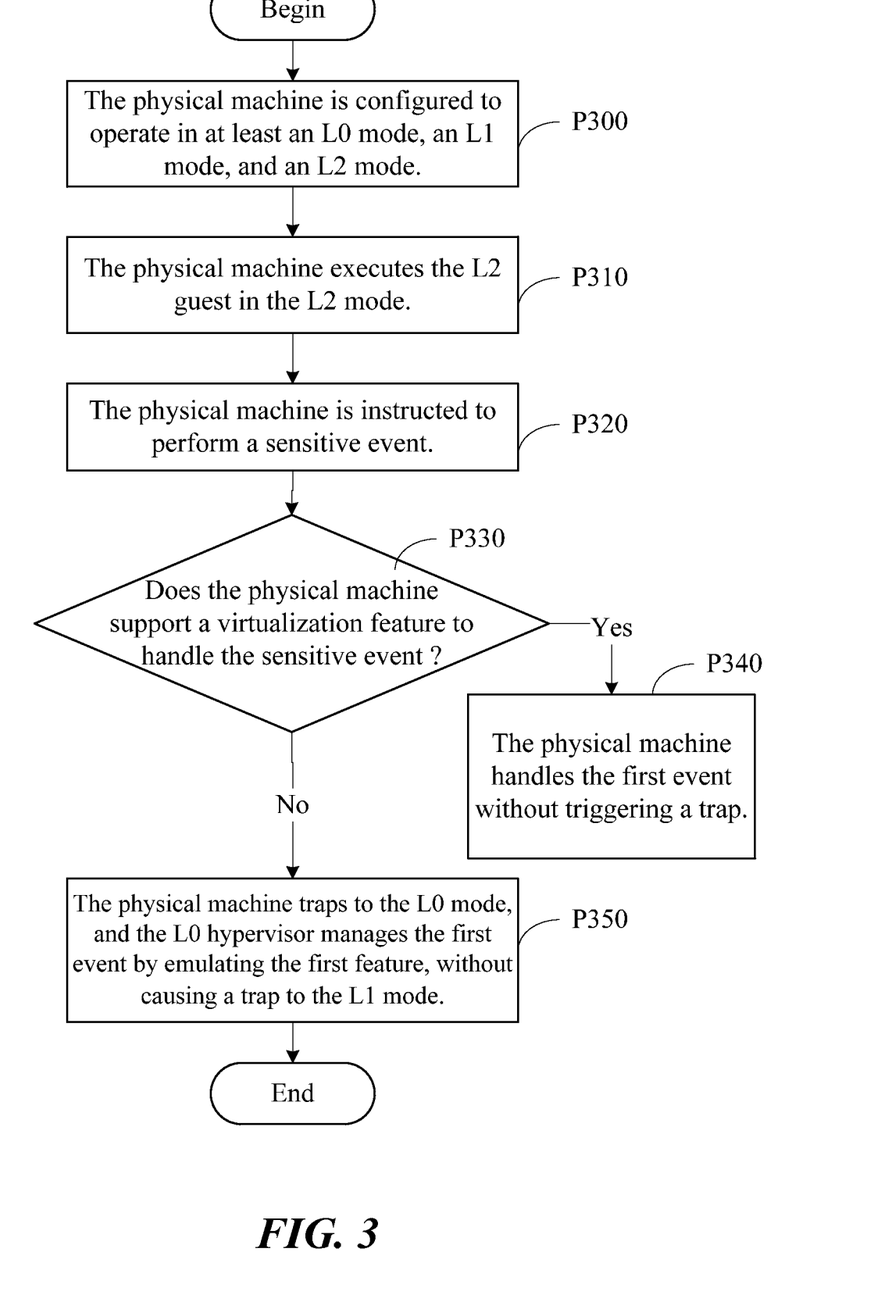
FIG. 3 is a flow chart of a method for accessing a virtualization feature, in accordance with one embodiment.

Referring to FIGS. 1B and 3, in accordance with one embodiment, the physical machine 110 is configured to operate in at least an L0 mode, an L1 mode, and an L2 mode (P300). In response to the L1 hypervisor launching L2 guest 140, the physical machine 110 executes the L2 guest 140 in the L2 mode (P310). While operating in the L2 mode, the physical machine 110 may be instructed to perform a first event (i.e., a sensitive event or a privileged instruction) associated with a first feature (P320). If the physical machine 110 supports a virtualization feature to handle the first event (P330), the physical machine 110 handles the first event without triggering a trap (P340).

Otherwise, the physical machine 110 traps to the L0 mode, and the L0 hypervisor 120 manages the first event by emulating the first feature, without causing a trap to the L1 mode (i.e., without intervention from the L1 hypervisor 130 (P350). In other words, the need to execute a privileged instruction that is not supported by the physical machine 110 causes control to be transferred to the L0 hypervisor 120 such that the physical machine 110 reverts to execution of the L0 hypervisor 120. Moreover, since the L1 hypervisor 130 is provided with the illusion that the first feature exists, there is no need to trap between the L1 and L2 modes.

Though emulating a feature consumes processor cycles, exposing the feature to the L1 hypervisor 130 for emulation may significantly reduce performance overhead caused by traps between virtualization levels L0, L1, and L2. By exposing the requested feature and emulating that feature at the L0 level, the L0 hypervisor effectively multiplexes a single-level support of the feature across multiple virtualization levels, in one embodiment, thereby reducing the amount of interaction between the multiple nested levels that would have otherwise ensued. In other words, the above systems and methods may improve performance in situations where a virtualization feature is not supported by hardware.

In one implementation, the processes provided above with reference to FIGS. 2 and 3 may be applied to extended or nested page tables (EPT/NPT). EPT/NPT is a hardware-supported feature that provides virtualization of a memory management unit (MMU). Some processors use a software-only mechanism referred to as shadow page tables to provide virtualization of a MMU. The shadow page tables may cause high performance overhead due to a trap that may be caused by page faults, page table updates, and page table pointer register accesses.

The performance overhead caused by the shadow page tables may be reduced by configuring the L0 hypervisor to detect whether the EPT/NPT feature is supported by the processor. If the EPT/NPT feature is not supported by the processor, the L0 hypervisor exposes the EPT/NPT feature to an L1 hypervisor and the L1 hypervisor detect and enables the EPT/NPT feature to run L2 guest (i.e., makes the EPT/NPT feature available when running the L2 guest).

During execution of the L2 guest by the processor, the processor may be instructed to create an event associated with the EPT/NPT feature (e.g., a page fault, a page table update, a page table pointer register access, or other related event) and trap to the L0 mode where the L0 hypervisor emulates the EPT/NPT feature by constructing a shadow page table to run the L2 guest using an L2 page table provided by the L1 hypervisor. Compared to the scenario where the L0 hypervisor uses a first set of shadow page tables to run the L1 hypervisor and the L1 hypervisor uses a second set of shadow page tables to run the L2 guest, the processes provided above allow the L0 hypervisor to provide MMU virtualization for the L2 guest without intervention from the L1 hypervisor.

In other implementations, the processes provided above with reference to FIGS. 2 and 3 may be applied to features such as, but not limited to, single root input/output virtualization (SR-IOV), hardware virtualization (VMX/SVM) extensions, and interrupt remapping. For example, in one implementation, the L0 hypervisor may expose an SR-IOV device to the L1 hypervisor even if there is no such device. Exposing the device may help the L0 hypervisor to manage L2 input/output (I/O) operations directly, without L1 hypervisor intervention, for example.

In another implementation, the L0 hypervisor may expose VMX/SVM extensions to the L1 hypervisor when running on an x86 processor or a low-range, x86 processor without VMX/SVM extensions. Despite using an old binary translation mechanism to virtualize the x86 architecture, the L0 hypervisor may expose VMX/SVM extensions to the L1 hypervisor. With such a configuration, binary translation may be fully supported by the L0 hypervisor and improved by determining which events caused by the L2 guest are to be managed by the L0 hypervisor.

As provided above, hypervisors that are limited to running on hardware with VMX/SVM extensions (e.g., KVM and Hyper-V) may run as a guest hypervisor on a platform without the VMX/SVM extensions. Further, if VMX/SVM extensions are updated to add support for redirecting interrupts directly to a guest, the L0 hypervisor may expose these features to the L1 hypervisor in order to inject interrupts directly to the L2 guest without L1 hypervisor intervention.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4:
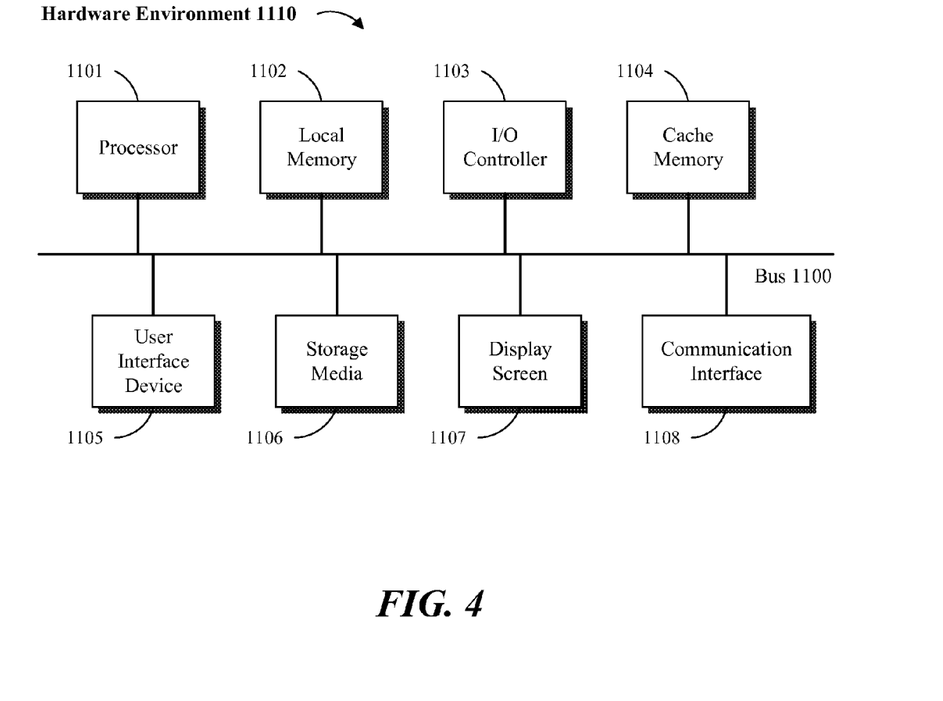
FIGS. 4 and 5 are diagrams of hardware and software environments in which a system of the present invention may operate, in accordance with one or more embodiments.
Figure 5:
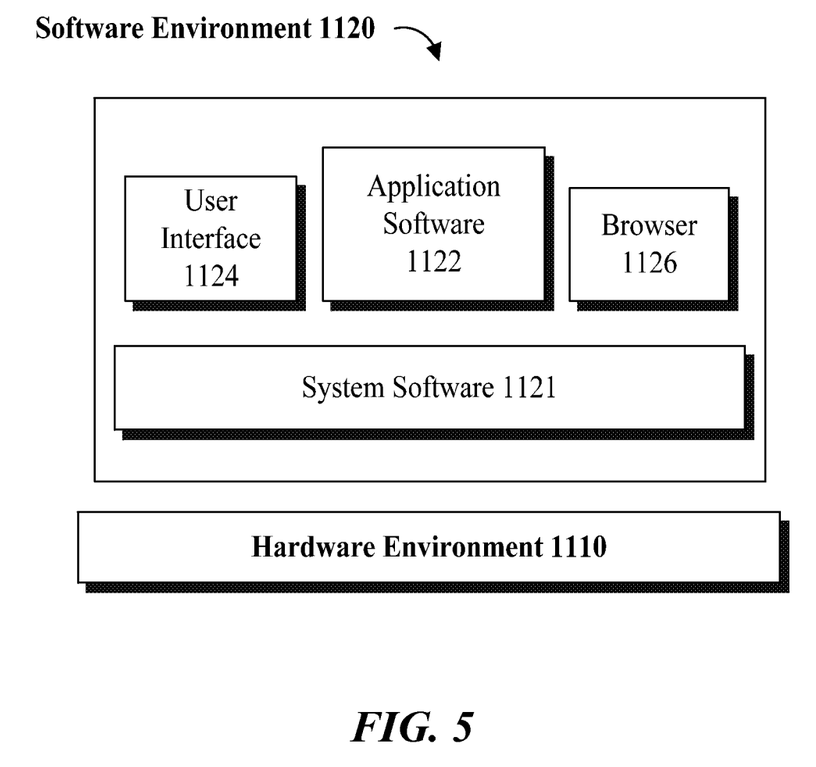

Referring to FIGS. 4 and 5, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 5, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for improving performance in a nested virtualization environment, the method comprising:
   detecting, by a first software, a first set of features supported by a hardware device having one or more processors,
      wherein the first software runs on the hardware device,
      wherein the first software is implemented to host a second software that runs in a nested operating environment over the first software,
      wherein the first software supports a second set of features utilized by the second software,
      wherein the second set of features is not supported by the hardware device;
   the first software configured to emulate the second set of features utilized by the second software, when the second software runs in the nested environment over the first software; and
   the first software exposing one or more features in the second set of features to the second software so that the second software detects and enables the exposed features for a third software hosted by the second software,
   wherein when the third software issues an instruction to be performed by the one or more processors of the hardware device, it is determined whether the instruction may be executed based on the first set of features supported by the hardware device or based on the second set of features supported by the first software,
   wherein the first software emulates a first feature to manage the instruction, in response to determining that the instruction may be executed based on the first feature in the second set of features,
   wherein the emulating is performed, in response to the physical machine switching to a second mode from a first mode, when it is determined that the physical machine does not support the feature needed to execute the instruction.

2. The method of claim 1, wherein the hardware device executes the first software in a first mode, the second software in a second mode, and the third software in a third mode.

3. The method of claim 2, wherein the hardware device executes the third software in the third mode, in response to launching of the third software by the second software.

4. The method of claim 3, wherein the hardware device traps to the first mode, in response to being instructed to create a sensitive event associated with the first feature.

5. The method of claim 3, wherein the hardware device traps to the first mode, in response to being instructed to create a sensitive event that the second software handles.

6. The method of claim 5, wherein the hardware device traps to the first mode, in response to determining that the first feature is not included in the first set of features.

7. The method of claim 6, wherein the hardware device traps to the first mode such that control is transferred to the first software.

8. The method of claim 1, wherein the first feature is a memory management virtualization feature.

9. The method of claim 1, wherein the first feature is a hardware virtualization extension feature.

10. The method of claim 1, wherein the first feature is an interrupt virtualization feature.

11. A computer-implemented system for improving performance in a nested virtualization environment, the system comprising:
   a hardware device having one or more processors;
   a first software detecting a first set of features supported by the hardware device,
      wherein the first software runs on the hardware device,
      wherein the first software is implemented to host a second software that runs in a nested operating environment over the first software,
      wherein the first software supports a second set of features utilized by the second software,
      wherein the second set of features is not supported by the hardware device;
   the first software configured to emulate the second set of features utilized by the second software, when the second software runs in the nested environment over the first software; and
   the first software exposing one or more features in the second set of features to the second software so that the second software detects and enables the exposed features for a third software hosted by the second software,
   wherein when the third software issues an instruction to be performed by the one or more processors of the hardware device, it is determined whether the instruction may be executed based on the first set of features supported by the hardware device or based on the second set of features supported by the first software,
   wherein the first software emulates a first feature to manage the instruction, in response to determining that the instruction may be executed based on the first feature in the second set of features,
   wherein the emulating is performed, in response to the physical machine switching to a second mode from a first mode, when it is determined that the physical machine does not support the feature needed to execute the instruction.

12. The system of claim 11, wherein the hardware device executes the first software in a first mode, the second software in a second mode, and the third software in a third mode.

13. The system of claim 12, wherein the hardware device executes the third software in the third mode, in response to launching of the third software by the second software.

14. The system of claim 13, wherein the hardware device traps to the first mode, in response to being instructed to create a sensitive event associated with the first feature.

15. The system of claim 13, wherein the hardware device traps to the first mode, in response to being instructed to create a sensitive event that the second software handles.

16. A non-transitory computer readable storage medium for storing logic code executable on a computing machine, wherein execution of the logic code causes the computing machine to:
   detect, using a first software, a first set of features supported by the hardware device
      wherein the first software runs on the hardware device,
      wherein the first software is implemented to host a second software that runs in a nested operating environment over the first software,
      wherein the first software supports a second set of features utilized by the second software,
      wherein the second set of features is not supported by the hardware device;
   the first software configured to emulate the second set of features utilized by the second software, when the second software runs in the nested environment over the first software; and
   the first software exposing one or more features in the second set of features to the second software so that the second software detects and enables the exposed features for a third software hosted by the second software, wherein when the third software issues an instruction to be performed by the one or more processors of the hardware device, it is determined whether the instruction may be executed based on the first set of features supported by the hardware device or based on the second set of features supported by the first software, wherein the first software emulates a first feature to manage the instruction, in response to determining that the instruction may be executed based on the first feature in the second set of features, wherein the emulating is performed, in response to the physical machine switching to a second mode from a first mode, when it is determined that the physical machine does not support the feature needed to execute the instruction.

17. The computer readable storage medium of claim 16, wherein the hardware device executes the first software in a first mode, the second software in a second mode, and the third software in a third mode.

18. The computer readable storage medium of claim 17, wherein the hardware device executes the third software in the third mode, in response to launching of the third software by the second software.

19. The computer readable storage medium of claim 18, wherein the hardware device traps to the first mode, in response to being instructed to create a sensitive event associated with the first feature.

20. The computer readable storage medium of claim 18, wherein the hardware device traps to the first mode, in response to being instructed to create a sensitive event that the second software handles.

* * * * *